2,065,259

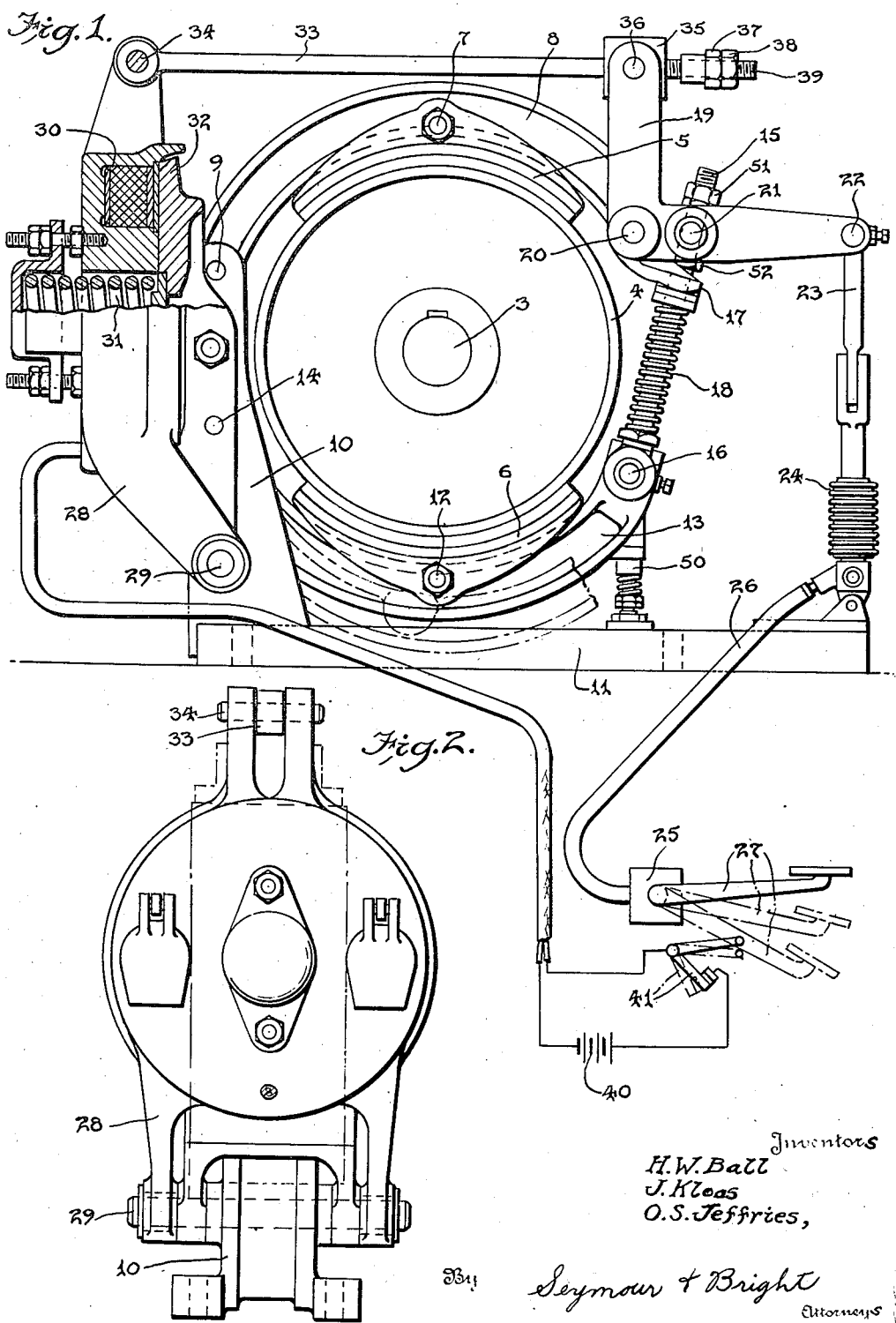
Dec. 22, 1936.  H. W. BALL ET AL  2,065,259
HYDRAULIC BRAKE
Filed Feb. 13, 1935
Inventors
H. W. Ball
J. Kleas
O. S. Jeffries,
By Seymour & Bright
Attorneys Patented Dec. 22, 1936

UNITED STATES PATENT OFFICE 2,065,259

HYDRAULIC BRAKE

Harvey W. Ball, John Kloos, and Oscar S. Jeffries, Alliance, Ohio, assignors to The Morgan Engineering Company, Alliance, Ohio Application February 13, 1935, Serial No. 6,356

8 Claims. (Cl. 188—151)

This invention relates to improvements in hydraulic brakes, and the primary purpose of the invention is to combine with such brakes, an electrically operated safety means so constructed that in case of failure of a hydraulic control means for the brakes, the safety mechanism will come into play and apply the brakes.

Another object of the invention is to combine with the brake shoe operating mechanism, a solenoid so attached that it will set the brake in case the fluid carrying mechanism should fail. This solenoid is preferably energized and normally holds a compression spring in compression, which spring comes into play and applies the brakes when the solenoid is de-energized.

A further object is to provide a safety device for hydraulic foot operated brakes; the brake pedal being employed to set the safety feature in action automatically in case of a failure of the hydraulic means.

In accordance with the invention, an electrically controlled mechanism is combined with a conventional foot controlled brake, whereby when the brake pedal is depressed beyond a certain extent, it will act to release the current from a solenoid and allow a spring to set the brake.

With the foregoing objects outlined and with other objects in view which will appear as the description proceeds, the invention consists in the novel features hereinafter described in detail, illustrated in the accompanying drawing, and more particularly pointed out in the appended claims.

The invention will now be described in detail, in connection with the accompanying drawing, in which, Fig. 1 is a side elevation, partly in vertical section, of one embodiment of the improved mechanism.

Fig. 2 is an end view of the same.

Referring to the drawing, 3 designates any suitable element, such as a shaft to be controlled by a brake drum 4 which cooperates with an upper shoe 5 and a lower shoe 6. The upper brake shoe is pivotally connected at 7 to an arc-shaped lever 8 which is pivotally mounted at one end on an axle 9 supported by a stationary post 10 that projects upwardly from a stationary base 11.

The lower shoe is pivotally connected at 12 to a similar lever 13 that has one of its ends pivotally mounted at 14 on said post.

An eye-bolt 15 is pivotally connected at 16 to the opposite end of the lever 13 and passes through an eye 17 in the lever 8; a spring 18 surrounding this bolt and functioning to normally maintain the shoes out of contact with the brake drum.

The brake shoes are moved toward the drum by means of a bell-crank lever 19 pivotally mounted on the lever 8 at the point 20, and having an element 21 engageable with the bolt 15.

One arm of the lever is pivotally connected at 22 to linkage 23 that is operatively associated with a piston, not shown, arranged in a hydraulic bellows type cylinder 24. The hydraulic fluid acting on this piston functions to set or apply the brakes, and this fluid is normally controlled by a foot operated valve 25 which controls the flow of the fluid through a pipe 26 into the cylinder. The valve has a foot pedal 27, and when that pedal is depressed to a normal degree, the fluid will enter the cylinder 24 and apply the brakes.

As the hydraulic mechanism sometimes fails to function through leakage or the like, we have provided safety mechanism to take care of this disadvantage. In accordance with our invention, a lever 28 has its lower end pivotally connected at 29 to the post 10, and this lever carries a solenoid 30 and a strong compression spring 31. Normally, the solenoid is held by magnetic attraction in contact with a stationary pole 32 fixed to the post 10, so that the spring is held under compression.

A rod 33 has one of its ends connected at 34 to the upper end of the lever 28, and its opposite end slidably engages a bearing abutment 35, pivotally connected at 36 to the upper arm of the bell-crank lever 19.

Adjusting nuts 37 and 38 engage threads 39 on the rod 33. By releasing the nut 38, the nut 37 can be turned until the magnet 30 is drawn tight against the pole 32, and at such time, if the current is on, the lever 28 will be held in engagement with said pole and the spring 31 will be held under compression. Now, the nut 37 can be backed off a sufficient distance to allow the bell-crank lever 19 to occupy a position where the brake shoes will give sufficient clearance for the brake wheel to rotate without friction when the brake mechanism is released. From this time forward, the mechanism will operate in the usual way, but it will be noted that the solenoid or electrical magnet 30 is in an electric circuit having a battery 40 and a switch 41, the latter being controlled by the pedal 27. When the pedal is depressed beyond its usual range, through failure of the hydraulic mechanism, the switch will be opened, and the electric energy will be released from the solenoid 30. Consequently, the lever 28 will be released from the pole 32, and the spring 31 will move that lever in a counter-clock-wise direction, with the result that the rod 33 will swing the bell-crank lever 19 in a counter-clock-wise direction about the pivot 20, and thus set the brake.

For balancing up the brake shoes, the brake is set in released position, that is, the magnet 30 is against the pole 32, and the plunger in the brake cylinder 24 is in its lowest position. Then the adjusting nut 50 arranged between the lever 13 and the base 11, is adjusted so that the shoe 6 has about one-thirty second of an inch clearance between it and the brake drum, and the shoe 5 is adjusted for clearance by adjusting nuts 51 and 52 arranged on the eye-bolt 15. This completes the adjustment of the brake. As shown in Fig. 1, the lever 13 may be lowered to the dotted line position when the nut 50 is loosened.

If the magnet is released, the brake is applied, or if the foot pedal 27 is pressed down, the hydraulic pressure cylinder shoves up the substantially horizontal arm of the bell-crank lever 19 and applies the brake.

From the foregoing it will be understood that the spring 31 is used for applying the brake in case of hydraulic failure, and that the magnet is used to hold the brake in released position as long as the control switch is in or closed. Of course, the failure of the hydraulic medium, which would allow the foot lever to over-travel and open the switch, would de-energize the magnet and allow the compression spring to set the brake.

One embodiment of the invention is described above and illustrated in the accompanying drawing, but it will be apparent to those skilled in the art that changes may be made in the details disclosed, without departing from the spirit of the invention, as expressed in the claims.

What is claimed and desired to be secured by Letters Patent is:

1. In braking mechanism, a brake drum, a brake shoe cooperating therewith, an element for applying said shoe to the drum, power means for controlling the operation of said element, a second element adapted to be actuated by the operator for controlling the operation of said power means, a stationary pole, a member movable relatively to said pole and operatively connected to said first element, electro-magnetic means cooperating with said second element for holding the member in engagement with said pole, and spring means for moving the member away from the pole when the electro-magnetic means is de-energized due to abnormal movement of said second element, whereby said first element is caused to apply the shoe to the drum in case of failure of the power means.

2. In braking mechanism, a brake drum, a brake shoe cooperating therewith, an element for applying said shoe to the drum, power means for controlling the operation of said element, a second element adapted to be actuated by the operator for controlling the operation of said power means, a stationary pole, a member movable relatively to said pole and operatively connected to said first element, electro-magnetic means cooperating with said second element for holding the member in engagement with said pole, and spring means for moving the member away from the pole when the electro-magnetic means is de-energized due to abnormal movement of said second element, whereby said first element is caused to apply the shoe to the drum in case of failure of the power means, said electro-magnetic means being controlled by the second element.

3. Braking mechanism of the character described, comprising a brake drum, brake shoes movable toward and away from said drum, movable members carrying said shoes, an element connecting the last mentioned members, a bell-crank lever cooperating with said element for moving the members toward the drum, power means for actuating said bell-crank lever, a second element adapted to be actuated by the operator for controlling the operation of said power means, a stationary pole, a lever member cooperating with said pole and operatively connected with said bell-crank lever, electro-magnetic means cooperating with said second element for normally holding the lever member in engagement with said pole, and spring means for moving the lever member away from the pole when the electro-magnetic means is de-energized due to abnormal movement of said second element, whereby said bell-crank lever cooperates with said first element to apply the shoes to the drum.

4. In braking mechanism, a brake drum, a support arranged adjacent to said drum, pivoted levers connected to said support, brake shoes carried by said levers and cooperating with said drum, an eye-bolt connecting said levers, a spring surrounding said bolt and normally holding the levers in such positions as to maintain the shoes out of contact with the drum, a bell-crank lever pivotally mounted on one of the first mentioned levers and having first and second arms, means operatively connecting the second one of said arms to said bolt, power means connected to said second arm for controlling the operation of said shoes, an element adapted to be actuated by the operator for controlling the operation of said power means, a stationary pole, a lever operatively connected to the second arm of the bell crank lever for actuating the latter in case of a failure of said power means, electro-magnetic means cooperating with said element for normally holding the last mentioned lever in engagement with said pole, and spring means for moving the last mentioned lever away from the pole when the electro-magnetic means is de-energized due to abnormal movement of said element.

5. In braking mechanism, a brake drum, a support arranged adjacent to said drum, pivoted levers connected to said support, brake shoes carried by said levers and cooperating with said drum, an eye-bolt connecting said levers, a spring surrounding said bolt and normally holding the levers in such positions as to maintain the shoes out of contact with the drum, a bell-crank lever pivotally mounted on one of the first mentioned levers and having first and second arms, means operatively connecting the second one of said arms to said bolt, power means connected to said second arm for controlling the operation of said shoes, an element adapted to be actuated by the operator for controlling the operation of said power means, a stationary pole, a lever operatively connected to the second arm of the bell-crank lever for actuating the latter in case of a failure of said power means, electro-magnetic means cooperating with said element for normally holding the last mentioned lever in engagement with said pole, and spring means for moving the last mentioned lever away from the pole when the electro-magnetic means is de-energized, said electro-magnetic means being controlled by said element.

6. Braking mechanism comprising a drum, brake shoes cooperating therewith, means for controlling the operation of said shoes and including a foot pedal, a stationary pole, a member movable toward and away from said pole and operatively connected to the last mentioned means, electro-magnetic means cooperating with said first mentioned means for holding said member in engagement with said pole, means for controlling the electro-magnetic means by said pedal, and means for moving said member away from said pole when the electro-magnetic means is de-energized.

7. In braking mechanism, a brake drum, a brake shoe cooperating therewith, an element for applying said shoe to the drum, hydraulic means for controlling the operation of said element and provided with a control valve, a second element adapted to be actuated by the operator for controlling said valve, spring means operatively connected with the first element for applying said shoe to the drum, electrically operated means for controlling said spring means, and a switch for controlling said electrical means, said switch being arranged for operation by said second element when said second element is moved to an abnormal degree, whereby said first element is caused to apply the shoe to the drum in case of failure of the hydraulic means.

8. Braking mechanism comprising a drum, brake shoes cooperating therewith, means for controlling the operation of said shoes and including an element adapted to be moved by the operator, a stationary pole, a member movable toward and away from said pole and operatively connected to the last-mentioned means, electro-magnetic means cooperating with said first-mentioned means for holding said member in engagement with said pole, means for controlling the electro-magnetic means by said element, and means for moving said member away from said pole when the electro-magnetic means is de-energized.

HARVEY W. BALL.
JOHN KLOOS.
OSCAR S. JEFFRIES.